United States Patent [19]

Paffoni et al.

[11] Patent Number: 4,486,237

[45] Date of Patent: Dec. 4, 1984

[54] COMPOSITE PIGMENTS AND PROCESS FOR THEIR PREPARATION

[75] Inventors: Camillo Paffoni, Pogno; Luigi Balducci, Mortara; Giorgio Bottaccio; Marcello Pieroni, both of Novara, all of Italy

[73] Assignee: Montefluous S.p.A., Milan, Italy

[21] Appl. No.: 468,121

[22] Filed: Feb. 22, 1983

[30] Foreign Application Priority Data

Feb. 22, 1982 [IT] Italy .............................. 19786 A/82

[51] Int. Cl.$^3$ .............................................. C04B 31/40
[52] U.S. Cl. .......................... 106/308 Q; 106/288 B; 106/288 Q; 106/300; 106/308 B
[58] Field of Search ............... 106/300, 308 B, 308 Q, 106/288 Q, 789, 788 B

[56] References Cited

U.S. PATENT DOCUMENTS

| | | | |
|---|---|---|---|
| 2,007,980 | 7/1935 | Neumann | 106/289 |
| 2,305,088 | 12/1942 | Brook et al. | 106/289 |
| 3,582,380 | 6/1971 | Hamilton | 106/308 Q |
| 3,832,205 | 8/1974 | Lowery | 106/300 |
| 4,022,636 | 5/1977 | Murray | 106/300 |
| 4,098,758 | 7/1978 | Monte et al. | 106/300 |
| 4,222,788 | 9/1980 | Liedek et al. | 106/289 |

*Primary Examiner*—Richard L. Andrews
*Assistant Examiner*—Terryence Chapman
*Attorney, Agent, or Firm*—Morgan, Finnegan, Pine, Foley & Lee

[57] ABSTRACT

Novel composite pigments containing both organic and inorganic portions have been produced.

These pigments consist of an inorganic binary titanium dioxide/aluminum hydrate component, in a percent quantity comprised between 70% and 95% by weight, the remaining organic component amounting to between 5% and 30% by weight, consisting of an organic dye selected from the group consisting of azoic and quinophtalonic compounds, containing in their structure at least one carboxylic and/or sulphonic, substantially salified, acid function.

The pigments are obtained according to a co-precipitation process, under substantially alkaline controlled pH conditions, of the acid organic dye together with the aluminum hydroxide (hydrated aluminum), by acidification of a solution and/or an aqueous dispersion of the acid organic dye in sodium aluminate, in the presence of titanium dioxide, at from 40° C. to about 80° C., and by a subsequent lacquering by treatment with an aqueous solution of an alkaline-earth metal salt (Ca, Mg, Ba, Sr) or of a Mn, Zn salt.

The above-mentioned pigments are insoluble in water and in common organic solvents. They possess, moreover, a good dyeing power, an excellent stability under heat, a good fastness to light, a good fastness to bases and acids, to migration in plastic materials and stability to over varnishing in the stove, etc. Lastly, they may be obtained with different degrees of covering power.

Thus, the pigments find a preferential application in varnishing products, air-drying and stove-baked enamels, in the pigmentation of plastic materials, in inks and in the beprinting of fabrics, etc., by means of conventional applicational methods.

14 Claims, No Drawings

COMPOSITE PIGMENTS AND PROCESS FOR THEIR PREPARATION

BACKGROUND

1. Field of Invention

This invention relates to novel composite pigments, their preparation and their use such, for example, in inks, varnishes, plastic materials.

2. Prior Art

Prior to the present invention there has been extensive work in the preparation of pigments containing inorganic and organic portions to impart certain desirable properties to the pigment. For example, the prior art has sought to obtain pigments showing dulling properties comparable with those of traditional inorganic pigments, such as for instance chrome yellows, and molybedenum oranges, whose preparation and use meet with ever increasing limitations because of their toxicity.

There has been suggested a number of pigments based on the attribution and/or boosting of the pigmentary properties in organic dyes of the acid type, by means of varnishing and supporting technologies which may lead to complexes of a pigmentary character, and consisting of an organic portion and an inorganic portion.

In this connection, it is known that the acid dyes are compounds which contain in their molecule acid groups ($COOH$, $SO_3H$), which confer to the products a solubility in water or in alkaline media, and are mainly used in the dyeing of natural or synthetic polyamidic fibres.

It is equally known that some of these dyes may form insoluble compounds ("toners"), lacquers, with alkaline earthy metal salts (Ca, Ba, Mg, Sr) and/or of another nature (Mn, Zn, Al). Such compositions, however, do not possess the hiding power of the traditional inorganic pigments (chromium yellows, molybedenum oranges). On the contrary, in the stage of dyeing the manufactured articles, they are mechanically mixed together with inorganic fillers or charges of various kinds. Depending on the type of application, the fillers or charges may consist of compounds of either modest (for instance barytes) or of high hiding power (e.g. $TiO_2$).

Nonetheless, in the case of the use of fillers of a high hiding power ($TiO_2$), there will be required the use of compounds highly coloured and/or in the great quantity in order to attain high colour intensities, with the consequential economical burdens.

The prior art reports also the association of the organic pigment with inorganic fillers, carried out in the stage of the synthesis of the pigment itself. In fact, there are known products of the lacquer-type, prepared in the presence of inorganic substrates, of which the most common are basic Al-compounds (basic sulphate-Pigment White 24) or mixes of $BaSO_4$ and Al-hydrage (Pigment White 23).

According to such a technique, the precipitation of the lacquers normally occurs in two steps or stages; for instance, at first the basic aluminum sulphate is precipitated from Al-sulphate under controlled pH and temperature conditions. Thereupon, to this precipitate there are added, in the given order, the dye solution and the solution containing a metered quantity of $BaCl_2$ so that the precipitation of the insoluble salt of the organic dye and of the Barium sulphate on the $Al(OH)_3$ substrate will occur simultaneously.

This technique will practically allow the preparation "in situ" of the inorganic substrate and the obtainment of a colour-accepting surface, but will, however, show poor hiding properties.

According to other processes, in the synthesis stage there are used inorganic substrates of high hiding properties such as e.g. $TiO_2$. In fact, it is known that acid dyes may be made to precipitate under controlled pH-conditions (pH=2-5), in the presence of $TiO_2$ or other inorganic substrates.

In the described cases, however, the resulting products do not offer, under the applicational profile, any appreciable advantages with respect to the mechanical mixes of single components.

According to another described method, the acid dye is made to precipitate in the form of an Al-, Cr- etc., lacquer, in the presence of lignin sulphonates.

OBJECTS OF INVENTION

A common characteristic of the processes of co-precipitation is that of achieving the formation of organic-inorganic compositions substantially consisting, on a binary base, of an organic dye lacquer supported on an inorganic substrate by precipitation.

Thus, an object of this invention is that of providing organic-inorganic products on a ternary base, having hiding properties and dyeing powers at least comparable with those of the coloured inorganic pigments (chromium yellows, molybedenum oranges, etc.), which properties are the reference terms for their applicational possibilities.

Still another object of this invention is that of providing organic-inorganic products which on the whole will show applicative pigmentary properties that are greater than those of the mechanical mixes of the single components.

Still another object is that of providing a process that is useful for the preparation of the aforementioned pigments of this invention.

These and still other objects, will become clearer to the skilled in the art from the description of the invention which follows.

GENERAL DESCRIPTION OF THE INVENTION

It has been found that objects of this invention may be realized by providing a class of composite ternary pigments consisting of an inorganic binary composition based on T-dioxide and Al-hydroxide, for obtaining high physical pigmentary characteristics, and of an organic or chromophoric dyeing component, which by itself may even lack pigmentary characteristics and be intimately bonded to the former by co-precipitation.

The linkage or bond between the organic and inorganic components turns out to be so strong and stable as to ensure high applicational characteristics for the pigmentary complex.

In the context of the description that will follow, the term "composite pigment" shall thus mean that reference is made to a pigmentary material consisting of a combination of an organic dying component with a solid inorganic binary substrate or support, based on Ti-dioxide and Al-hydroxides, obtained according to a co-precipitation method, which will be defined more clearly further on.

The above-indicated combination of organic dye with an inorganic binary support or carrier gives place to a ternary composition endowed with high pigmentary characteristics that will make it suited for various different applications.

More particularly, the pigments of this invention are composite organic-inorganic pigments on a ternary base, substantially consisting of an inorganic binary titanium dioxide/aluminum hydrate component in a ratio comprised between 70% and about 95% by weight, the remaining organic component, corresponding to between about 5% and about 30% by weight, consisting of an organic dye selected from the group consisting of azoic and quinophtalonic dyes, containing in their structure at least one acid carboxylic (—COOH) and/or sulphonic (—SO$_3$H) function, substantially salified; said pigments being obtained according to the co-precipitation process described in more detail further on.

The composite pigments on a ternary base of this invention, are preferably characterized in that they contain an azoic or quinophtalonic organic dye containing at least one salified —COOH— or —SO$_3$H group, in a proportion comprised between about 10% and about 25% by weight, while the ratio TiO$_2$/salified organic acid dye shall be comprised between about 1:1 and 5:1, and preferably between 2:1 and 4:1, while the salified organic dye/Al(OH)$_3$ ratio is at least about 1:1.

Lastly, the organic dyes, containing the above-defined acid groups, are present in the ternary pigmentary composition of the present invention, in the form of salts of alkaline-earthy metal cations, preferably selected from the group consisting of Ca, Mg, Ba, Sr or in the form of cations chosen between Mn and Zn.

The composite pigments of the present invention, endowed with the specific above indicated pigmentary characteristics, may be prepared by a co-precipitation process wherein the co-precipitation is carried out (1) under controlled and substantially alkaline pH conditions, of the acid organic dye with aluminum hydrate; (2) by acidification of an aqueous solution or a solution dispersion of the acid organic dye in sodium aluminate, in presence of titanium dioxide at about 40° C. to about 80° C.; and (3) by the successive lacquering treatment with an aqueous solution of an alkaline-earthy metal salt (Ca, Mg, Ba, Sr) or of a Mn Sn salt, etc.

The process of this invention is thus characterized in that a solution and/or a suspension of the acid organic dye in an aqueous medium, having a pH>10.5 in the presence of NaAlO$_2$, after the introduction of the TiO$_2$, is gradually brought to a pH between 9.5 and 10.5 by the addition of a mineral acid. There is then introduced a metal salt in quantities substantially greater than the stoichiometric quantity with respect to the acid dye and said solution or suspension is then brought to a pH between 6.5 and 7.5 at a temperature comprised between about 40° C. and about 80° C. within a stretch of time between about 0.5 and 2 hours, and the resulting product is then separated.

The starting materials of an inorganic nature, used in the process of this invention, are titanium dioxide or titanium dioxide based pigments and sodium aluminate.

As far as the TiO$_2$ is concerned, there may be used the commercial types obtained through the process via sulphate or chloride; normally they present superficial treatments suited for imparting to the products particular properties of photostability (light fastness), dispersability, etc. There may also be used suitably ground non-post-treated types of TiO$_2$ rutile. Nothing stands in the way of using TiO$_2$ anatase or calcination intermediates with a rutile-anatase structure.

Lastly, there may be used coloured inorganic pigments based on TiO$_2$, such as for instance C.I. Pigment Yellow 53 (Ti-Ni-Sb)O$_2$ and C.I. Pigment Yellow 118 (Ti-Ni-Sb-Cr)O$_2$.

As far as sodium aluminate is concerned, there are normally used aqueous solutions with a titre of, for instance, 500–650 g/lt of NaAlO$_2$.

The dyes which are suitable for the process of this invention, are azoic or quinophtalonic dyes, as indicated above, containing in their molecule at least one —COOH or —SO$_3$H group which be susceptible to forming lacquers substantially insoluble with preferably alkaline earthy metals.

The dyes preferably show poor solubility in water and a good solubility in an alkaline medium from which they be precipitable by acidification at a pH≧7 while they furthermore possess possibly high molar extinguishing coefficients so that there may be obtained products showing high tinctorial or dyeing properties even when operating with dye levels of the order of 10% by weight on the finished product.

Dyes, whose characteristics meet the above-indicated requisites and that be partially suited for use in the process object of the present invention, are those of either the azoic or quinophtalonic acid type.

More particularly, it proved to be quite convenient to use, according to this invention, dyes having the formula (I) and (II) belong to the following classes: quinophtalonic dyes of the formula (I)

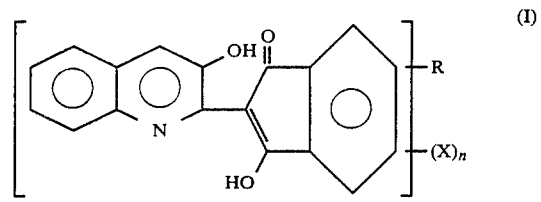

wherein:

R represents —COOH, —SO$_3$H;

X represents a halogen, preferably chlorine, bromine, while n is an integer comprised between 0 and 4.

-azoic dyes of formula (II):

$$A-N=N-B \qquad (II)$$

wherein:

A represents a diazotable amine chosen from amongst aromatic, carbocyclic and heterocyclic also substituted amines, containing at least one group chosen between —COOH and —SO$_3$H, while B represents a copulation agent.

Preferred azoic dyes of formula (II) are those in which A represents a benzenic amine, of formula (III):

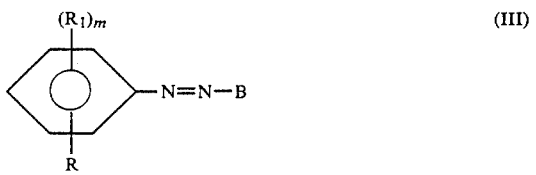

wherein:

R represents a group chosen between —COOH and —SO$_3$H;

$R_1$ represents a hydrogen atom, a halogen, preferably chlorine, bromine or a group chosen from amongst alkyl groups having up to 4 carbon atoms, the nitro-group and the $NHCOCH_3$ group; m represents an integer chosen between 1 and 3, while for $m>1$ the $R_1$ group may also be different from each other, while A may, moreover, represent derivatives of the aminoanthraquinone of the formula:

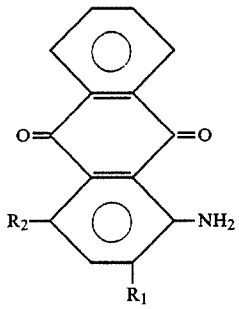

wherein: $R_1$ is: —H, —COOH, $SO_3H$, Br; $R_2$ is: H, halogen; B represents a copulation agent, preferably chosen between 1-phenyl-3-methyl-pyrazolin-5-one of formula:

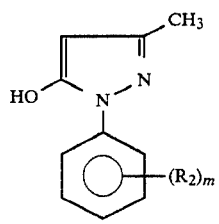

wherein: $R_2$ represents a hydrogen atom, a halogen, preferably chlorine, bromine, a nitro-group; m represents a number chosen from between 1 and 3;
1-phenyl-3-carboxy-pyrazolin-5-one;
1-phenyl(4-sulphonic)-3-methylpyrazolin-5-one of formula:

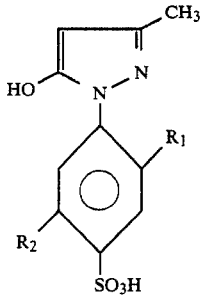

wherein: $R_1$ and $R_2$ are: H, halogen;
3-cyano-2,6-dihydroxy-4-methyl-pyridine of formula:

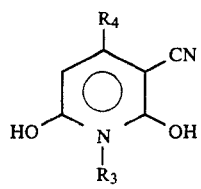

wherein:
$R_3$ represents a hydrogen atom or an alkyl group having up to 4 carbon atoms, while $R_4$ represents an alkyl group with up to 4 carbon atoms equal to or different from $R_3$;
2,4,6-(iH,3H,5H)-pyrimidinthrione;
2,4-dihydroxyquinoline;
2-methyl-1-H-benzopyrrole of formula:

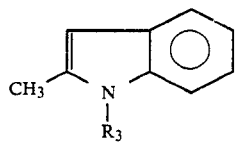

wherein:
$R_3$ represents a hydrogen atom or an alkyl group having up to 4 carbon atoms:
2-phenyl-1-H-benzopyrrole of formula:

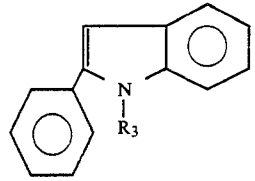

wherein:
$R_3$ represents a hydrogen atom or an alkyl group having up to 4 carbon atoms;
β-naphtol; β-oxynaphtoic acid; 2,4,6-triaminopyrimidine; 2,3-dihydroxypyridine; naphtalinsulphonic acids (e.g.: γ-acid, iso-γ acid, Neville-Winter acid). The use of other aromatic copulation agents is nonetheless compatible with the prescriptions of the present invention. Lastly, particularly effective may be considered with the field of above listed classes, the following terms:

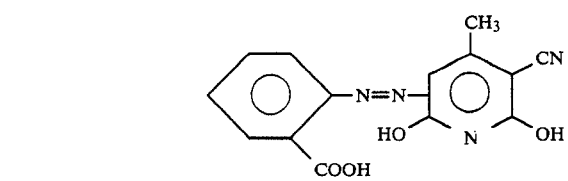

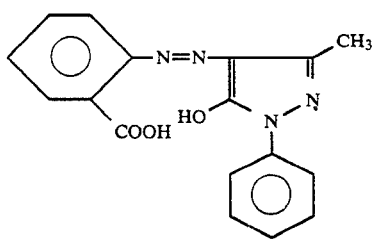

-continued
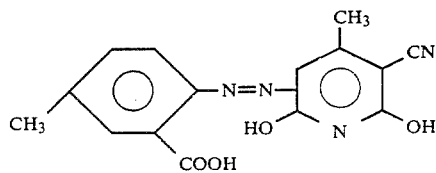
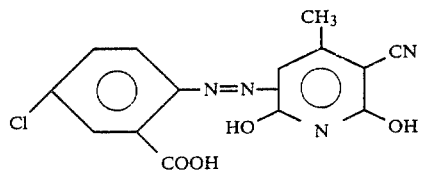
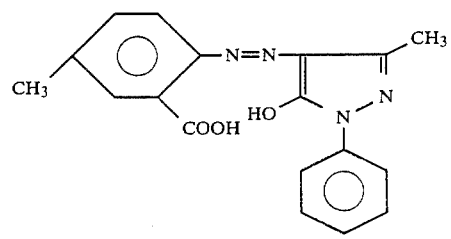
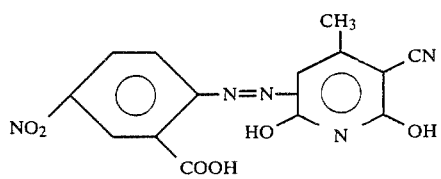
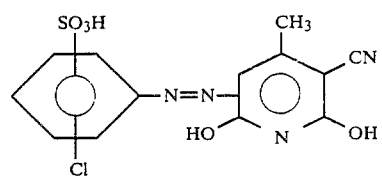
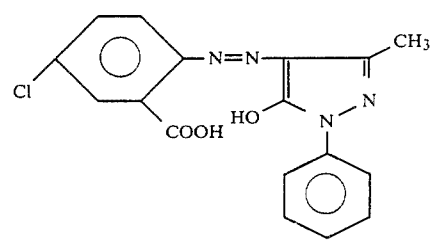
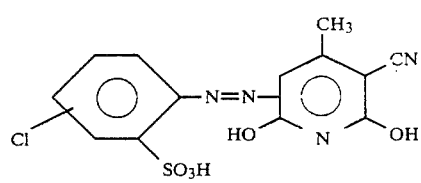
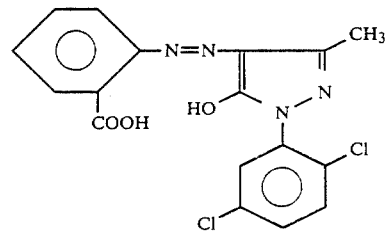
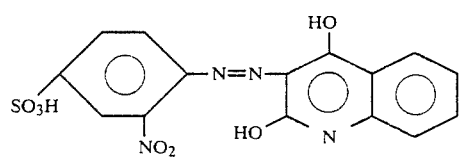
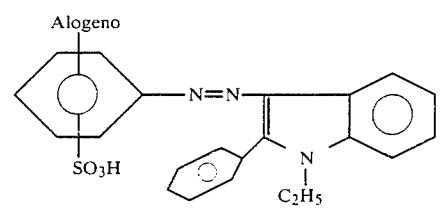

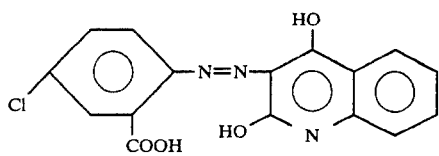
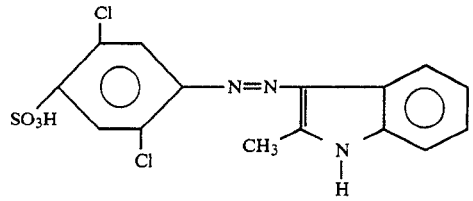
-continued
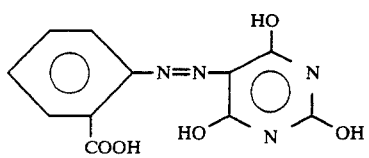
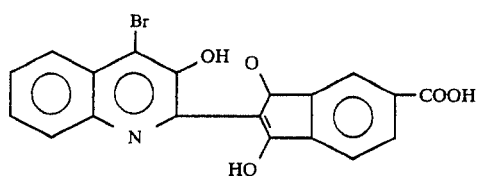
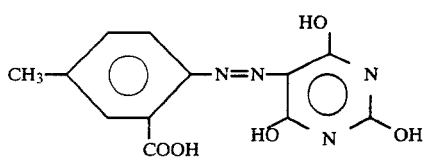
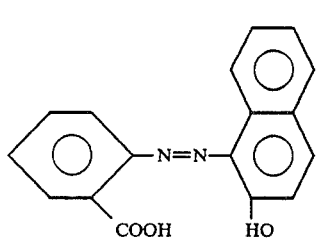
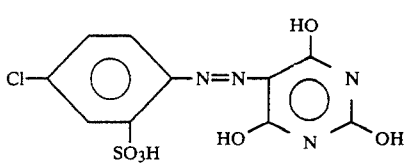
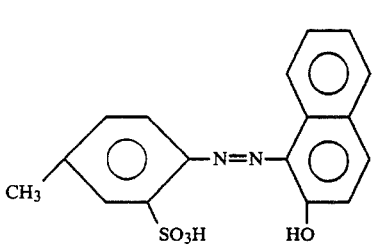
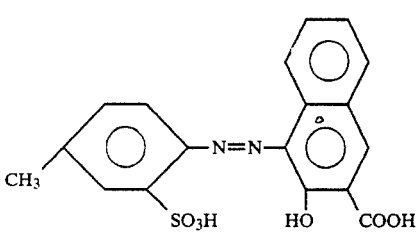
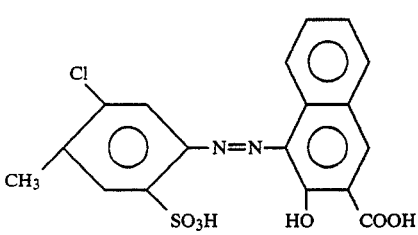
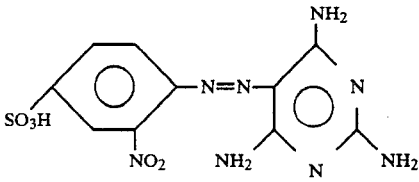
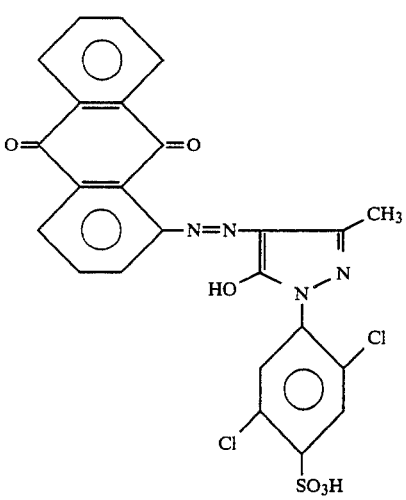
It is a question of dyes already described in the technical literature or to be found on the market. They may be prepared according to the quite known conventional methods.

The concentration of dye in the aqueous solution or dispersion in sodium aluminate may vary within a wide range of concentrations, depending on the solubility of the single dye. Just for purposes of orientation, in practice there may be used concentrations comprised between about 5 and 30 g/lt.

The quantity of $NaAlO_2$ used in the process of the invention depends, on the contrary, on the type of desired pigmentary composition (degree of transparency).

The $NaAlO_2$ may optionally be used combined with minor quantities of NaOH.

The solution or dispersion of the dye is carried out at a temperature comprised between about 40° C. and about 80° C., but preferably is effected at a temperature of between 40° C. and 60° C., that is, in the same temperature range to be maintained in the successive co-precipitative phase.

The addition of the $TiO_2$ in its prechosen structure, is preferably carried out in the form of an aqueous paste prepared separately. Or, again, according to a convenient embodiment of the present invention, there may be directly used the filtration cake of the $TiO_2$ just as obtained in production, before its drying.

The $TiO_2$ may, at last, be added, also directly, to the solution or dispersion of the dye, in the form of a powder. The same may be said for the $TiO_2$-based pigments.

The co-precipitation phase of the aqueous solution or dispersion of the dye in the presence of sodium aluminate and, possibly, of NaOH, is achieved by using mineral acids, preferably HCl.

The acid concentration is not critical: operational values, when using HCl, are comprised between 50 and 200 g/lt or equivalents; the co-precipitation phase will thus be carried out in a much more effective way.

The first co-precipitation phase, under operational conditions of the process, will require operational times comprised between about 0.5 and 2 hours, and preferably comprised between 1 and 1.5 hours.

At the end of the first co-precipitation stage, to the resulting aqueous slurry having a pH-value of about 10, there is admixed the solution of the chosen metal salt, preferably Ca, Ba, Mg, Sr; also Mn and Zn salts are compatible. This addition is carried out over a lapse of time of about 30 minutes.

The metal is added in the form of a soluble salt, in an at least stoichiometric quantity with respect to the quantity required for co-precipitating the corresponding salt in the acid dye used in the form of an insoluble lacquer; in order to ensure such an effect, there are used quantities of from 2 to 4 times greater.

After the introduction of the salt of the metal, the dye precipitates salified together with the Al-hydrate in a substantially alkaline medium. This process will allow to obtain the formation of coloured coatings of the $TiO_2$ and the formation of a coloured microcrystalline $Al(OH)_3$.

The combined effect of these operational conditions leads to the imparting to the final pigmentary product of chemical physical characteristics and applicational properties of a particular interest, so as to make these new pigments very similar to those of the chromium yellow type.

At the end of the addition of the metal salt, and keeping the suspension obtained within the same temperature range at which had been effected the co-precipitation stage, under stirring, the pH value is gradually brought up to a value comprised between 8.5 and 9, and successively down to between 6.5 and 7.5, by the addition of a mineral acid (HCl).

The final neutralization stage is preferably conducted for a total stretch of time of between 45 and 90 minutes, but at any rate until achievement of the completion and stabilization of the co-precipitated suspension. The total duration of the process is comprised between about 2 and 4 hours.

Thereupon there follow the successive operations of: separation, drying, etc., conducted in a substantially conventional manner. For instance, the product is, at the end, filtered, washed to remove the soluble salts, and finally dried.

The drying is carried out at temperatures comprised between about 50° and 100° C., but preferably comprised between about 70° C. and about 80° C.

The pigment thus obtained is substantially already in the physical conditions most suited for its use. Nonetheless, the pigment is compatible with the conventional post-treatment operations.

Thus, for instance, the product may be ground, preferably micronizing or comminuting mills or in airject mills. This type of grinding allows to obtain products that are easily dispersed in oily vehicles, plastic materials, inks, etc., and which show improved applicational performances such as for instance a higher dyeing force, better hiding power, brightness of the coating film or of the ink.

The concentration of dye in the pigment, as well as the ponderal ratio $TiO_2$/dye, depend on the nature of the dye and on the pigmentary characteristics that one wishes to achieve.

Thus, for instance, using dyes that display high tintorial properties, the concentration of dye may vary between 10% and 25% by weight, while the ratio $TiO_2$/dye may attain values comprised between 1 and 5. In this case the pigments are characterized by a high hiding power and suitable dyeing power.

The residual inorganic part consists of aluminum hydroxide; the ratio $Al(OH)_3$/dye is, at any rate 1:at least 1 and depends obviously on the ratio $TiO_2$/dye.

The diffractometric analyses of the products obtained clearly evidence, besides the presence of rutile $TiO_2$ and/or anatase, the presence of $\beta$-$Al(OH)_3$ and of the microcrystalline product corresponding to the dye, in the form of an extremely dispersed Ca-, Mg-, Ba-, Sr-lacquer.

The products of the present invention show a specific surface area that varies between 20 and 100 sq.mt/g and is preferably comprised between about 40 and 60 sq. mt/g. Under the morphological profile, these products consist of two types of elementary particles: those of $TiO_2$ coated with an Al-hydroxide coating and/or with a dye, and those of Al-hydroxide in which the salified dye has been dispersed.

The pigments obtained according to this invention have a composition that varies within a wide range depending on the nature, quantity of dye, on the inorganic substrate ($TiO_2$ and $Al(OH)_3$), on the granulometry, on the specific surface area, etc.

The obtained pigments, offer moreover the advantage of being constituted by an inorganic component or substrate, of a low cost and suited for conferring to them excellent pigmentary characteristics, stably associated by co-precipitation with an organic dye of a high dyeing force and pure tone.

This advantage may be better appreciated when considering the fact that the organic dyes used according to the present invention may, as already indicated, even lack by themselves any pigmentary characteristic, which on the contrary is attained in the composite pigments of the present invention.

This will allow, in more than one application, to enable organic dyes, extending successfully their use, in an economically convenient way, to pigmentary applications of high industrial interest.

Under this aspect the present invention represents a considerable contribution to the solution of the problem represented by the high toxicity and/or high degree of pollution involved in the use of inorganical pigments of wide spread use and at present objectable just for these aspects, such as for instance the chromium and lead based pigments.

The mechanical and/or thermal treatments and/or the treatments with solvents, employed by the conventional techniques in the use of pigments in the various applicational fields, do not substantially modify the granulometry and, thus, the pigmentary characteristics of the products obtained according to the present invention.

Lastly, the presence of alumina hydroxide in a finely, homogeneously distributed form in the organic-inorganic system, exalts the known improving characteristics of the dispersibility and flame-retarding capability in general imparted by the alumina hydroxide to the pigments when conventionally used as a charge or filler or extender, associated with a low cost, without prejudicing the brightness of the tones and the dyeing power.

SPECIFIC DESCRIPTION OF INVENTION

The invention will now be described in more detail in the following, through examples given for merely illustrative and in no way limitative purposes.

The parts and percentages, etc., where not otherwise specified, are to be intended as parts and percentages by weight.

EXAMPLE 1

Into a 3 liter beaker, fitted with a mechanical stirrer, were dispersed, under vigorous stirring, in 1000 ml of water, 10 grams of a dye derived from anthranylic acid, diazotized and copulated on 3-cyano-2,6-dihydroxy-4-methylporidine, according to the known Prior Art, having the formula:

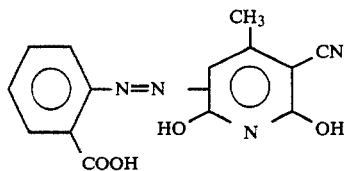

The suspension was then heated up to between 50° and 60° C., additioned with 30 ml of NaOH in a concentration of 80 g/lt, and subsequently additioned with 30 grams of NaAlO$_2$ (equivalent to 50 ml of solution with a concentration of 600 g/lt).

The pH attained a value of 11.2 and the complete solution of the dye could be observed.

A TiO$_2$ rutile dispersion consisting of 40 g of TiO$_2$ in 200 ml of water, was then admixed. The ensuing slurry was thereupon subjected to stirring for 30 minutes, whereafter there was started a slow, gradual acidification with HCl in a 50 g/lt concentration.

Once there had been attained, in 30 minutes and at a temperature comprised between about 50° and 55° C., a pH of 10.5, the slurry was additioned with 6 grams of CaCl$_2$ dissolved in 60 ml of water, over a period of 10 minutes. After 20 minutes the slow, gradual acidification with HCl was continued until reaching a pH of 9.5 and successively, in 30 minutes, was attained a pH of 7.

The pH was thereupon allowed to stabilize itself and, after 60 minutes, maintaining the temperature still between 50° and 55° C., the slurry was filtered. It was then washed with de-ionized water in order to remove the soluble salts, after which the resulting cake was dried at 80° C. and ground in an "ALPINE model CONTRA-PLEX 63" grinder, thereby obtaining 70 g of a yellow orange powder.

The elementary analysis of resulting product evidenced a carbon content corresponding to 14.5% of organic dye. The diffractometric analysis of the pigment showed the presence of TiO$_2$ rutile, $\beta$-alumina and microcrystalline dye, in the form of a lacquer intimately mixed with the alumina.

The specific surface area of the product amounted to 48 squ.mt/g, determined according to the SORPTOMETER method.

EXAMPLE 2

Operating as described in Example 1, the quantity of dye was varied bringing it up to 15 grams, while maintaining the 30 grams of NaAlO$_2$ and the 40 grams of TiO$_2$. The quantity of CaCl, the lacquering agent, was brought up to 9 g.

There were, thus, obtained 73 g of a yellow orange pigment showing a dyeing or colouring power clearly superior to that of Example 1, associated with a good hiding power and good all-round characteristics.

EXAMPLE 3

Operating as described in Example 1, but only reducing the quantity of TiO$_2$ to 30 grams, there were obtained 65 g of a yellow oranged pigment displaying a dyeing power greater than that obtained in Example 1, but with a lower hiding power.

EXAMPLES NOS. 4–45

Operating as described in Example 1, but using different dyes, the following pigments were obtained:

| DYES | Laquering metal | Tone of the pigment |
|---|---|---|
| 4 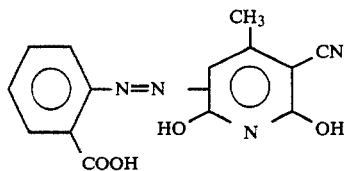 | Mg | Reddish-yellow |

-continued
| DYES | Laquering metal | Tone of the pigment |
|---|---|---|
| 5 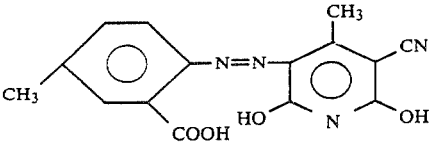 | Ca | Reddish-yellow |
| 6 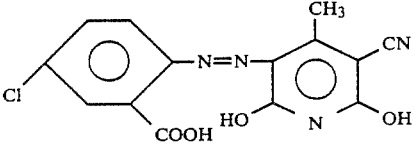 | Ca | Reddish-yellow |
| 7 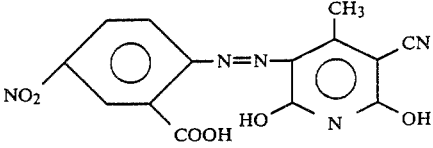 | Ca | Reddish-yellow |
| 8 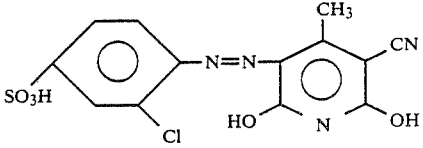 | Ca | Yellow |
| 9 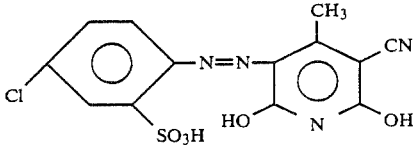 | Ca | Yellow |
| 10 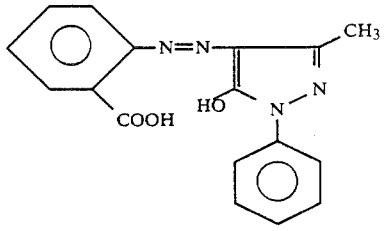 | Ca | Yellow |
| 11   " | Ba | Yellow |
| 12 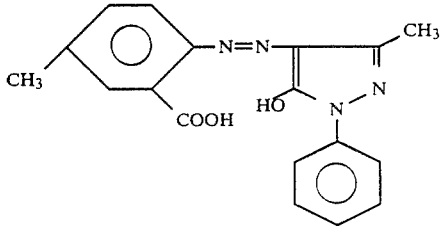 | Ca | Yellow |
| 13   " | Ba | Yellow |

-continued
| DYES | | Laquering metal | Tone of the pigment |
|---|---|---|---|
| 14 | 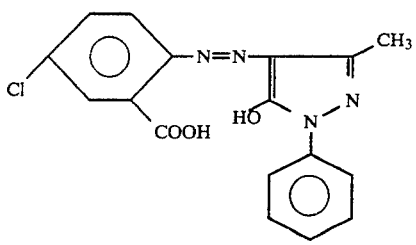 | Ca | Yellow |
| 15 | " | Ba | Yellow |
| 16 | 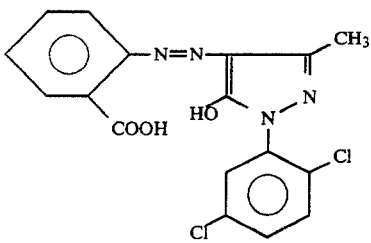 | Ca | Greenish-yellow |
| 17 | " | Ba | Greenish-yellow |
| 18 | 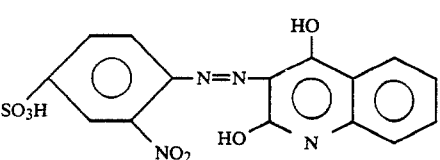 | Ca | Yellow |
| 19 | 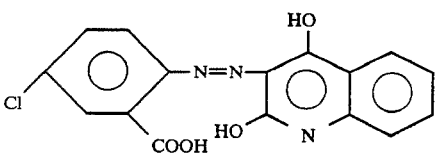 | Ca | Yellow |
| 20 | " | Ba | Yellow |
| 21 | 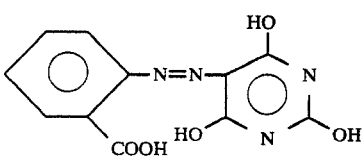 | Ca | Greenish-yellow |
| 22 | 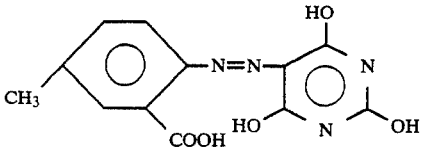 | Ca | Greenish-yellow |
| 23 | 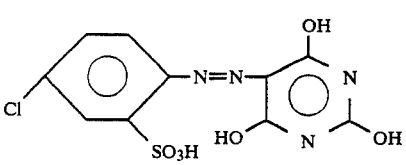 | Ca | Yellow |
| 24 | " | Ba | Yellow |

-continued
| DYES | Laquering metal | Tone of the pigment |
|---|---|---|
| 25 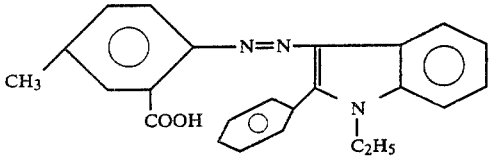 | Ca | Yellow |
| 26 " | Ba | Yellow |
| 27 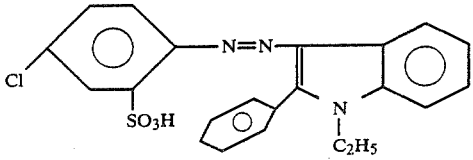 | Ca | Yellow |
| 28 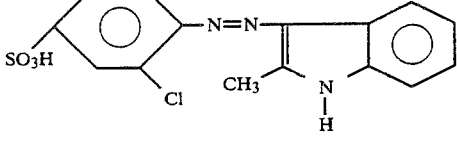 | Ca | Yellow |
| 29 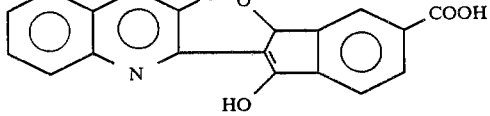 | Ca | Yellow |
| 30 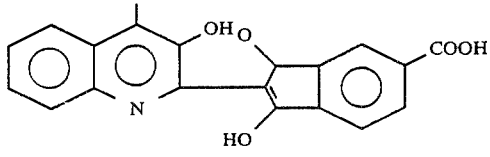 | Ca | Yellow |
| 31 " | Mg | Yellow |
| 32 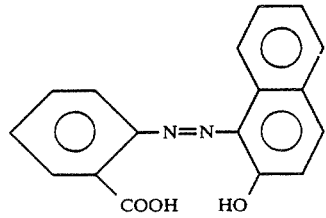 | Ca | Orange |
| 33 " | Ba | Orange |
| 34 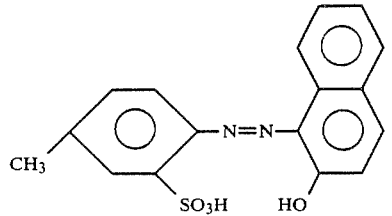 | Ba | Orange |
| 35 " | Sr | Orange |

| DYES | Laquering metal | Tone of the pigment |
|---|---|---|
| 36 (structure: methyl-phenyl-SO₃H with HO, COOH naphthyl, azo-linked) | Ba | Red |
| 37  " | Sr | Red |
| 38  " | Mn | Red |
| 39 (structure: chloro-methyl-phenyl-SO₃H with HO, COOH naphthyl, azo-linked) | Ba | Red |
| 40  " | Sr | Red |
| 41  " | Mn | Red |
| 42 (structure: anthraquinone-azo-pyrazole with CH₃, HO, N-(2,5-dichloro-4-sulfophenyl)) | Ca | Yellow |
| 43 (structure: SO₃H, NO₂-phenyl azo-linked to diaminopyrimidine with NH₂ groups) | Ca | yellowish-red |
| 44 (structure: Cl, COOH-phenyl azo-linked to diaminopyrimidine with NH₂ groups) | Ca | yellow |
| 45 (structure: COOH-phenyl azo-linked to HO, OH pyridine) | Ca | red |

EXAMPLE 46

Application in vehicles for rotogravure

To 1.5 grams of pigment, obtained according to claim 1, there were admixed:

22.5 g of a ground vehicle consisting of a phenolic resin suitably prepared in xylol, in a ponderal ratio of 30:70 by weight.

The formulate was ground in a 2-arms planetary flapping apparatus of the 'RED-DEVIL mod. 5400' type. Thereby there was obtained a fluid yellow orange ink which was spread over a card provided with black hands, in order to evaluate its hiding power by means of respectively 6µ and 24µ spreading bars.

In this way were evaluated the tone, the dyeing power and the hiding power of the pigment, which latter proved to be of a good quality showing high fastness characteristics.

EXAMPLE 47

Application in polyvinyl chloride 0.3 grams of a pigment obtained according to the procedures of Example 1, were dispersed in 70 g of polyvinyl chloride powder 'Syncron 548 FM' (trademark of MONTEDISON S.p.A.) with:

30 g of diotylphtalate as a plasticizer;
0.2 g of U.V stabilizer;
0.2 g of thermal stabilizer (Sn-organometal salts).

The paste was processed in a double-cylinder mixer for 4 minutes at 150° C. There were obtained sheets coloured in a dull yellow-reddish tone and characterized by a good overall fastness.

EXAMPLE 48

Applicational example for stove enamels 5 grams of the pigment obtained according to Example 1 were dispersed in 95 g of stove enamel vehicle, having the following formulation:

59 parts by weight of xylene,
22 parts by weight of alkyd resin,
19 parts by weight of melaminic resin and were then ground for 60 minutes in a 'Red-Devel Mod. 5400 grinder'. Thereby there was obtained an enamel showing a good fluidity, which is spread with a spreading bar for 74µ thickness on cards provided with black bands in order to evaluate the covering or hiding power of the enamel.

Said coated test pieces were baked in a stove at 125° C. for 30 minutes. (Thereby there was, thus, obtained a bright (shining) covering enamel with a yellow-orange tone, showing a good fastness and, in particular, with an excellent fastness to heat and overpainting.

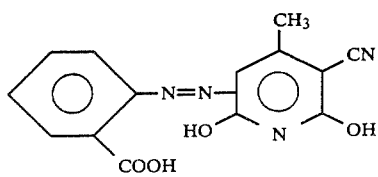
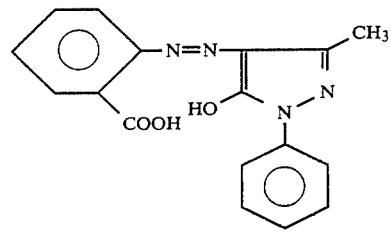
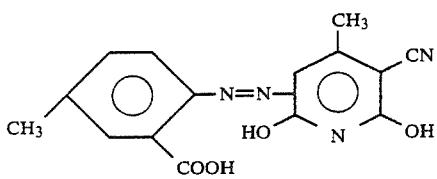
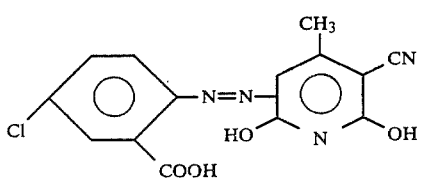
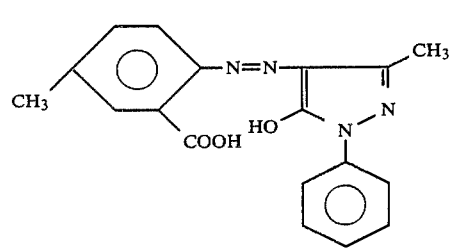
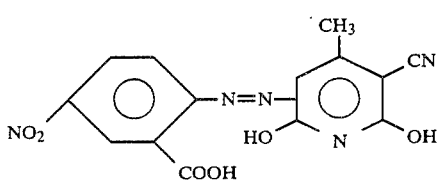
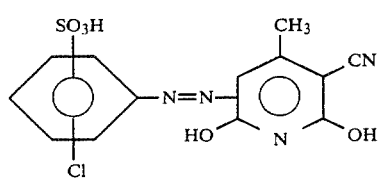
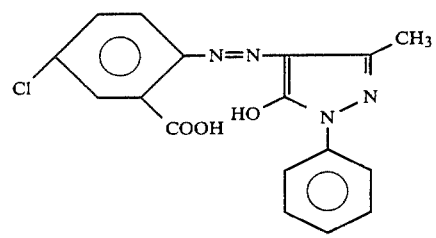
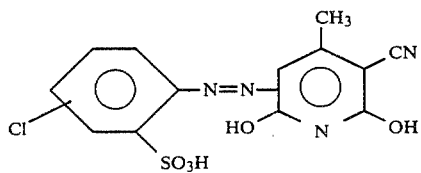
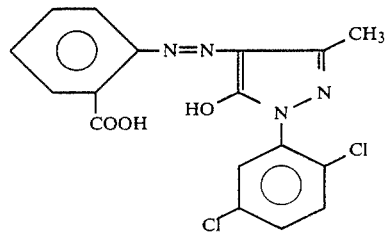
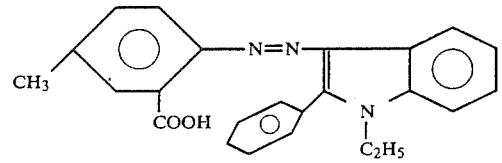

-continued
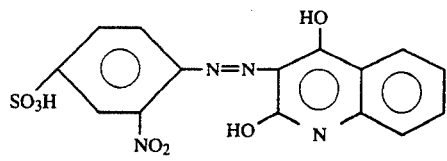 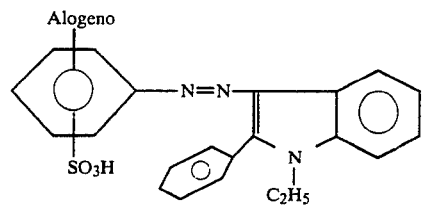
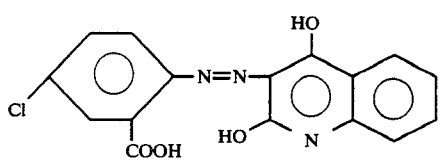 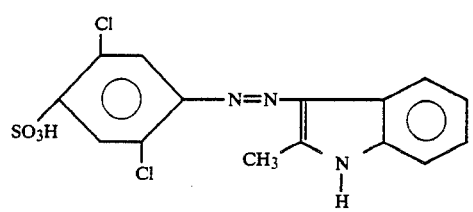
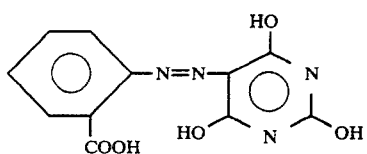 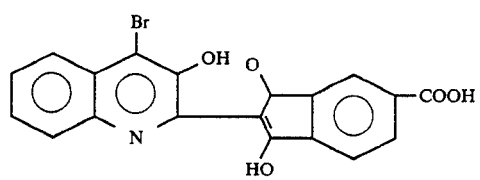
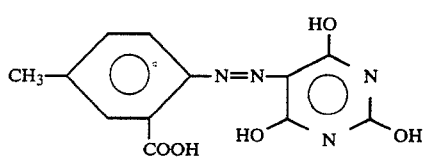 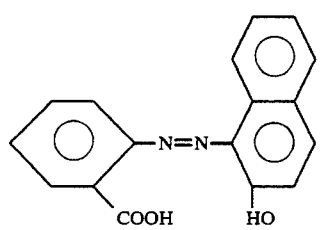
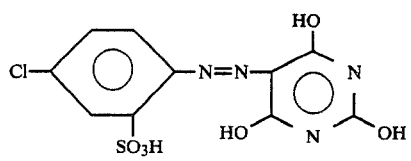 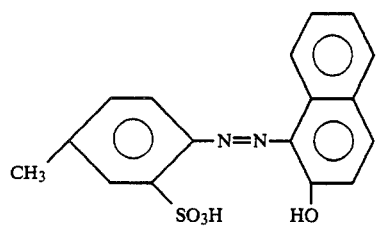
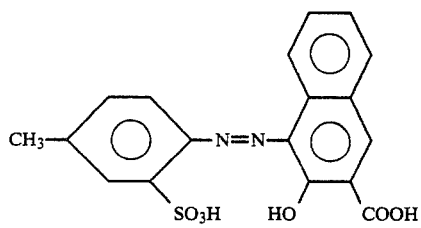 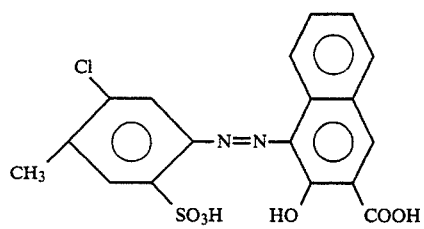

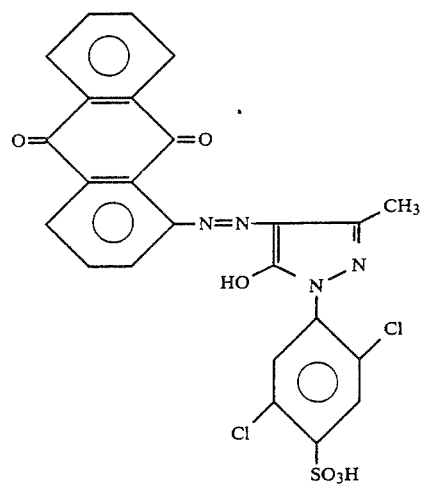
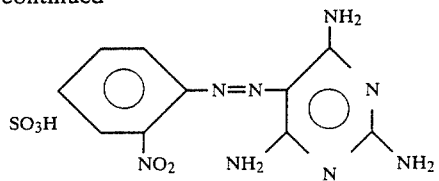

We claim:

1. Composite ternary pigments consisting of from 70 to 95% by weight of a binary inorganic component of titanium dioxide and aluminum hydroxide and from 5 to 30% by weight of a substantially salified organic acid dye, the ratio by weight salified dye/titanium dioxide being comprised between 1:1 and 1:5 and the ratio by weight salified dye/aluminum hydroxide being at most 1:1, in which the organic acid dye, selected from the group consisting of azoic and quinophthalonic dyes containing at least one carboxylic or sulphonic group, has been coprecipitated in form of a metal salt together with aluminum hydroxide, from an aqueous solution and/or dispersion of the acid dye and sodium aluminate, in the presence of titanium dioxide, at pH comprised between 9.5 and 10.5 and at a temperature of 40°–80° C.

2. Composite pigments according to claim 1 in which the acid dye is salified with a metal selected from the group consisting of the alkaline-earth metals, Mn and Zn.

3. Composite pigments according to claim 1 in which the titanium dioxide is selected from the group consisting of $TiO_2$ rutile, anatase and rutile anatase.

4. Process for the preparation of the composite pigments of claim 1, characterized in that an aqueous solution and/or dispersion consisting of an aqueous medium, an azoic or quinophtalonic dye containing at least one carboxylic or sulphonic group, sodium aluminate and titanium dioxide, having a pH > 10.5 and maintained at a temperature comprised between 40° and 80° C., is gradually acidified with a mineral acid at a pH comprised between 10.5 and 9.5 within a time interval of from 0.5 to 2 hours, and that, after the addition of an aqueous solution of a metal salt, the aqueous solution and/or dispersion is then acidified with a mineral acid at pH comprised between 7.5 and 6.5.

5. Process according to claim 4, in which the metal salt is selected from the group consisting of alkaline-earth metal salts, Mn salts and Zn salts.

6. Process according to claim 4, in which the metal salt is added in at least stoichiometric quantity with respect to the dye.

7. Process according to claim 4, in which the titanium dioxide is selected from the group consisting of $TiO_2$ rutile, anatase and rutile-anatase.

8. Process according to claim 4, in which the mineral acid is HCl.

9. Process according to claim 4, in which the sodium aluminate is used associated with minor quantities of sodium hydroxide.

10. Composite pigments according to claim 1, in which the organic acid dye is selected from the group consisting of quinophthalonic dyes having the formula:

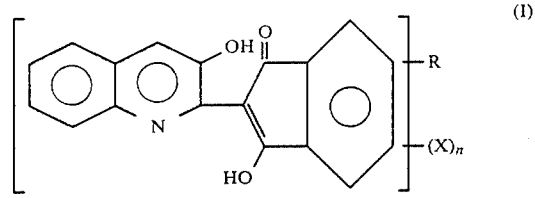

wherein:
R represents —COOH: —SO$_3$H;
X represents a halogen, preferably chlorine, bromine, and
n is an integer chosen from between 0 and 4.

11. Composite pigments according to claim 1, in which the organic acid dye is selected from the group consisting of azoic dyes having the formula:

wherein:
A represents a dizotable amine selected from the group consisting of aromatic carbocylic and heterocylic amines, also substituted that may contain at least one group selected from the group consisting of —COOH and —SO$_3$H groups, and where B represents a copulation agent.

12. Composite pigments according to claim 1, in which the organic acid dye is selected from the group consisting of azoic dyes having the formula:

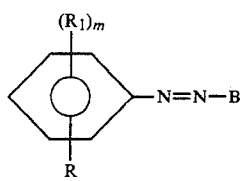 (III)

wherein:
R represents a group selected from the group consisting of —COOH and —SO$_3$H groups;
R$_1$ represents a hydrogen, halogen atom, preferably chlorine, bromine or a group selected from the group consisting of alkyl groups having up to 4 carbon atoms, nitro-group and the NHCOCH$_3$ group;
m represents an integer chosen from 1 to 3, while for m 1, the R$_1$ groups may also be different from each other; and chosen out of azoic dyes of formula:

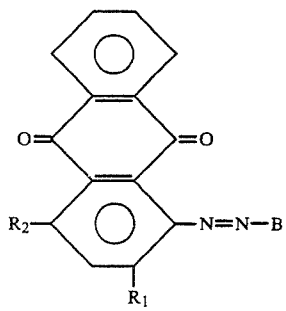

wherein:
R$_1$ is: —H, —COOH, —SO$_3$H, Br;
R$_2$ is H, halogen;
B represents a copulation agent.

13. Composite pigments according to claim 12 wherein the copulation agent B is selected from the group consisting of 1-phenyl-3-methyl-5-pyrazolone of formula:

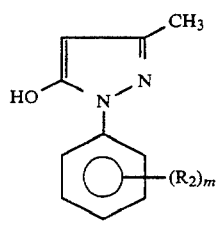

wherein:
R$_2$ represents a hydrogen atom, a halogen atom, preferably chlorine, bromine, a nitro-group;
m represents a number chosen from 1 to 3;
1-phenyl-3-carboxy-pyrazolin-5-one, 1-phenyl(4-sulphonic)-3methylpyrazolin-5-one of the formula:

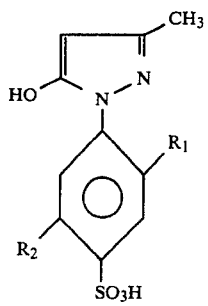

wherein:
R$_1$ and R$_2$ are: H, halogen; 3-cyano-2,6-dihydroxy-4-methyl-pyridine of formula:

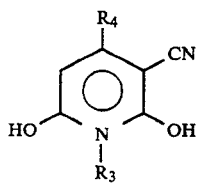

wherein:
R$_3$ represents a hydrogen atom or an alkyl group having up to 4 carbon atoms and where R$_4$ represents an alkyl group having up to 4 carbon atoms, either equal to or different from R$_3$;
2,4,6-(1H,3H,5H)-pyrimidinthrione;
2,4-dihydroxyquinoline;
2-methyl-1-H-benzopyrrol of formula:

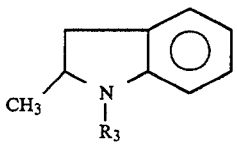

wherein:
R$_3$ represents a hydrogen atom or an alkyl group having up to 4 carbon atoms;
2-phenyl-1-H-benzopyrrol of formula:

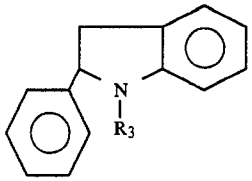

wherein:
R$_3$ represents a hydrogen atom or an alkyl group having up to 4 carbon atoms;
β-naphtol;
β-oxynaphtoic acid;
2,4,6-triaminopyrimidine;
2,3-dihydroxypyridine;
the naphtalinsulphonic acids.

14. Composite pigments according to claim 1, in which the organic acid dye is selected from the group consisting of dyes having the formula: